US008489057B2

(12) United States Patent
Mickle et al.

(10) Patent No.: US 8,489,057 B2
(45) Date of Patent: Jul. 16, 2013

(54) METHOD OF CONTROLLING RF TRANSMISSIONS TO MITIGATE INTERFERENCE WITH CRITICAL CARE MEDICAL EQUIPMENT

(75) Inventors: Marlin H. Mickle, Pittsburgh, PA (US); Ajay Ogirala, Pittsburgh, PA (US); Peter J. Hawrylak, Tulsa, OK (US); Joshua R. Stachel, Pittsburgh, PA (US)

(73) Assignee: University of Pittsburgh-Of the Commonwealth System of Higher Education, Pittsburgh, PA (US)

( * ) Notice: Subject to any disclaimer, the term of this patent is extended or adjusted under 35 U.S.C. 154(b) by 39 days.

(21) Appl. No.: 13/234,467

(22) Filed: Sep. 16, 2011

(65) Prior Publication Data
US 2012/0071115 A1 Mar. 22, 2012

Related U.S. Application Data

(60) Provisional application No. 61/383,892, filed on Sep. 17, 2010.

(51) Int. Cl.
*H04B 1/10* (2006.01)
(52) U.S. Cl.
USPC ....... 455/296; 455/501; 455/63.1; 455/114.2; 455/222; 375/346
(58) Field of Classification Search
USPC ............. 455/501, 63.1, 114.2, 296, 222, 223, 455/278.1; 375/346
See application file for complete search history.

(56) References Cited

U.S. PATENT DOCUMENTS

| | | | |
|---|---|---|---|
| 6,606,308 B1 * | 8/2003 | Genest et al. | 370/318 |
| 2002/0079957 A1 * | 6/2002 | Hubert | 327/552 |
| 2009/0110148 A1 * | 4/2009 | Zhang et al. | 378/95 |

OTHER PUBLICATIONS

Reference No. of working document ISo/IEC JTC 1/SC 31/WG 4/SG 3 N 000, Information technology—Radio frequency identification for item management—Part 3: Parameters for air interface communications at 13,56 MHz—Amendment Mode 3, 10 pp., Dec. 7, 2005.
Van Der Togt, Remko et al., "Electromagnetic Interference From Radio Frequency Identification Inducing Potentially Hazardous Incidents in Critical Care Medical Equipment,", JMMA, Jun. 25, 2008, vol. 299, No. 24, pp. 2884-2890.
Hayes, David L. et al., "Interference with Cardiac Pacemakers by Cellular Telephones," The New England Journal of Medicine, vol. 336, No. 21, pp. 1473-1479, Jun. 25, 2008.

* cited by examiner

*Primary Examiner* — Tuan Pham
(74) *Attorney, Agent, or Firm* — Eckert Seamans Cherin & Mellott, LLC; Philip E. Levy

(57) ABSTRACT

Various methods of mitigating RF inference with one or more critical care medical devices is provided, wherein a predetermined threshold energy acceleration value is associated with the one or more critical care medical devices that, if exceeded, will cause RF inference with the one or more critical care medical devices. The methods includes generating and transmitting RF energy, wherein at least a portion of said RF energy follows an RF power profile of power versus time having a particular format designed to mitigate interference.

10 Claims, 2 Drawing Sheets

METHOD OF CONTROLLING RF TRANSMISSIONS TO MITIGATE INTERFERENCE WITH CRITICAL CARE MEDICAL EQUIPMENT

CROSS-REFERENCE TO RELATED APPLICATIONS

This application claims priority under 35 U.S.C. §119(e) from U.S. Provisional Application No. 61/383,892 entitled "Method of Controlling RF Transmissions To Mitigate Interference With Critical Care Medical Equipment" and filed on Sep. 17, 2010, the disclosure of which is incorporated herein by reference.

FIELD OF THE INVENTION

The present invention relates to RF transmission systems, and in particular to a method of controlling RF transmissions in an RF transmission system such as an RFID system or a wireless communication system in a manner that mitigates interference with critical care medical equipment, such as, without limitation, cardiac rhythm management devices (CRMDs), like pacemakers.

BACKGROUND OF THE INVENTION

Radio Frequency (RF) devices are quite popular in many ubiquitous applications such as Radio Frequency Identification (RFID) systems and remote sensing. For example, RFID systems consist of a number of radio frequency tags or transponders (RFID tags) and one or more radio frequency readers or interrogators (RFID readers). The RFID tags typically include an integrated circuit (IC) chip, such as a complementary metal oxide semiconductor (CMOS) chip, and an antenna connected thereto for allowing the RFID tag to communicate with an RFID reader over an air interface by way of RF signals. In a typical RFID system, one or more RFID readers query the RFID tags for information stored on them, which can be, for example, identification numbers, user written data, or sensed data. RFID systems have thus been applied in many application areas to track, monitor, and manage items as they move between physical locations.

More specifically, current RFID readers transmit information to RFID tags by generating and transmitting through the air continuous wave (CW) RF energy signals using an ON/OFF pattern as shown in FIG. 1. As seen in FIG. 1, that pattern has a frame repetition period that includes: (i) an ON portion wherein RF energy is amplitude, frequency or phase modulated for a defined time period ($T_{ON}$) at a maximum (as determined by FCC regulations) CW power level in order to transmit desired information to one or more RFID tags, and (ii) an OFF portion immediately following the ON portion wherein no RF energy is transmitted. In addition, as seen in FIG. 1, the initial ON portion of the RFID reader immediately follows a period wherein no RF energy is transmitted, and thus when transmitting information, current RFID readers are programmed and structured to transition from generating and transmitting no RF energy (i.e., a rest state) to generating and transmitting some predetermined maximum CW RF energy.

It has been discovered that in certain circumstances, transmitting CW RF energy in this manner causes interference with some critical care medical equipment. For example, it has been discovered that transmitting CW RF energy in this manner can cause interference with the heart pacing signals that are received by and the pacing outputs that are generated by a CRMD such a pacemaker or an implantable cardioverter defibrillator (ICD). Furthermore, RFID readers are not the only devices that output CW RF energy in this manner. CW RF energy in this manner is also output by, for example, RF transmitters/emitters of wireless communications systems such as cellular telephone systems.

Thus, there is a need for a method of controlling RF transmissions by RF emitters in RF transmission systems (such as an RFID system or a wireless communication system) in a manner that mitigates interference with critical care medical equipment, such as, without limitation, CRMDs, like pacemakers or ICDs.

SUMMARY OF THE INVENTION

In one embodiment, a method of mitigating RF interference with one or more critical care medical devices is provided, wherein a predetermined threshold energy acceleration value is associated with the one or more critical care medical devices that, if exceeded, will cause RF interference with the one or more critical care medical devices. The method includes generating and transmitting RF energy, wherein at least a portion of the RF energy follows an RF power profile of power versus time, the RF power profile having an upward ramping portion wherein power of the RF energy monotonically increases, a stay portion immediately following the upward ramping portion wherein power of the RF energy is at a maximum, and a downward ramping portion immediately following the stay portion wherein power of the RF energy monotonically decreases, wherein at no point in the upward ramping portion does a slope thereof exceed the predetermined threshold energy acceleration value and wherein at no point in the downward ramping portion does an absolute value of a slope thereof exceed the predetermined threshold energy acceleration value.

In another embodiment, a method of transmitting information to one or more electronic devices that mitigates RF interference is provided. The method includes generating and transmitting RF energy, wherein at least a portion of said RF energy follows an RF power profile of power versus time, the RF power profile having an upward ramping portion represented by any monotonically increasing function $f_1(t)$, a stay portion immediately following the upward ramping portion wherein power of the RF energy is at a maximum, and a downward ramping portion immediately following the stay portion represented by any monotonically decreasing function $f_2(t)$, wherein the absolute value of the derivative of $f_1(t)$, $|d(f_1(t)/dt|$, for all t during the upward ramping portion must be <80 Watts/second, and wherein the absolute value of the derivative of $f_2(t)$, $|d(f_2(t)/dt|$, for all t during the downward ramping portion must be <80 Watts/second.

In still another embodiment, an alternate method of transmitting information to one or more electronic devices that mitigates RF interference is provided. This method includes generating and transmitting RF energy, wherein at least a portion of said RF energy follows an RF power profile of power versus time, the RF power profile having an upward ramping portion represented by any monotonically increasing function $f_1(t)$, a stay portion immediately following the upward ramping portion wherein power of the RF energy is at a maximum, and a downward ramping portion immediately following the stay portion represented by any monotonically decreasing function $f_2(t)$, wherein the upward ramping portion has a rise time wherein power of the RF energy goes from a minimum to a percentage of the maximum that is 100 milliseconds or less, and wherein the downward ramping portion has a fall time wherein power of the RF energy goes from the percentage of the maximum to the minimum that is 100 milliseconds or less.

In yet another embodiment, an alternate method of transmitting information to one or more electronic devices that mitigates RF interference is provided. This method includes generating and transmitting RF energy, wherein at least a portion of said RF energy follows an RF power profile of power versus time, the RF power profile having an upward ramping portion represented by any monotonically increasing function $f_1(t)$, a stay portion immediately following the upward ramping portion wherein power of the RF energy is at a maximum, and a downward ramping portion immediately following the stay portion represented by any monotonically decreasing function $f_2(t)$, wherein the monotonically increasing function $f_1(t)$ and the monotonically decreasing function $f_2(t)$ each define a non-linear curve.

In yet another embodiment, an RF emitter apparatus is provided that includes a control system and a radio module, wherein the control system is programmed to cause the radio module to generate and transmit RF energy according to an RF power profile of power versus time that is not a continuous wave (CW) ON/OFF pattern. The RF power profile has an upward ramping portion wherein power of the RF energy monotonically increases, a stay portion immediately following the upward ramping portion wherein power of the RF energy is at a maximum, and a downward ramping portion immediately following the stay portion wherein power of the RF energy monotonically decreases, the control system being programmed to cause the radio module to generate one or more particular power levels between zero power and the maximum during both the upward ramping portion and the downward ramping portion.

In another alternative embodiment, a method of mitigating RF interference with one or more critical care medical devices is provided, wherein a predetermined threshold energy acceleration value is associated with the one or more critical care medical devices that, if exceeded, will cause RF interference with the one or more critical care medical devices. The method includes generating and transmitting RF energy, wherein at least a portion of said RF energy follows an RF power profile of power versus time, the RF power profile having an upward ramping portion, a stay portion immediately following the upward ramping portion wherein power of the RF energy is at a maximum, and a downward ramping portion immediately following the stay portion, wherein, except for parts of the upward ramping portion that are too short in duration for rates of change of power exceeding the predetermined threshold energy acceleration to be detected by the one or more critical care medical devices and cause interference, the upward ramping portion monotonically increases and a slope of the upward ramping portion at any other parts thereof does not exceed the predetermined threshold energy acceleration value and wherein, except for parts of the downward ramping portion that are too short in duration for absolute values of rates of change of power exceeding the predetermined threshold energy acceleration to be detected by the one or more critical care medical devices and cause interference, the downward ramping portion monotonically decreases and an absolute value of a slope of the downward ramping portion at any other parts thereof does not exceed the predetermined threshold energy acceleration value.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
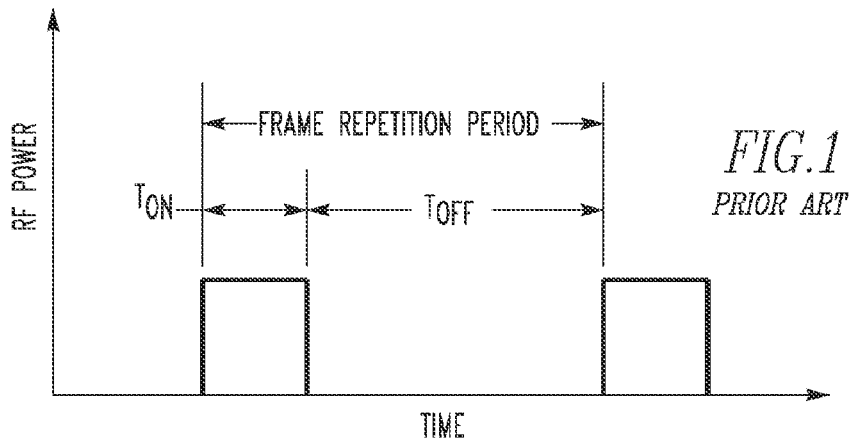
FIG. 1 is a schematic diagram demonstrating how current RFID readers transmit continuous wave (CW) RF energy using an ON/OFF pattern.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As employed, herein, the statement that two or more parts or components are "coupled" together shall mean that the parts are joined or operate together either directly or through one or more intermediate parts or components.

As employed herein, the statement that two or more parts or components "engage" one another shall mean that the parts exert a force against one another either directly or through one or more intermediate parts or components.

As employed herein, the term "number" shall mean one or an integer greater than one (i.e., a plurality).

The present inventors have discovered that it is not solely the magnitude or level of the power of the CW RF energy that is transmitted by an RF emitter such as an RFID reader that causes interference with some critical care medical equipment, but rather the magnitude of the energy acceleration (Watts/second or Joules/second$^2$) of the CW RF energy that causes the interference. In other words, the interference is caused by how quickly the CW RF energy reaches the maximum power level (the time rate of change of the power). Thus, in the typical ON/OFF pattern shown in FIG. 1 and described elsewhere herein, the OFF to ON and ON to OFF transitions, which exhibit relatively large energy accelerations (large time rates of change in going from no RF power to max RF power and from max RF power to no RF power), will, in certain circumstances, cause interference with critical care medical devices. The extent of the actual interference will depend on the maximum CW power levels involved and the energy acceleration sensitivity of the device in question.

Figure 2A:
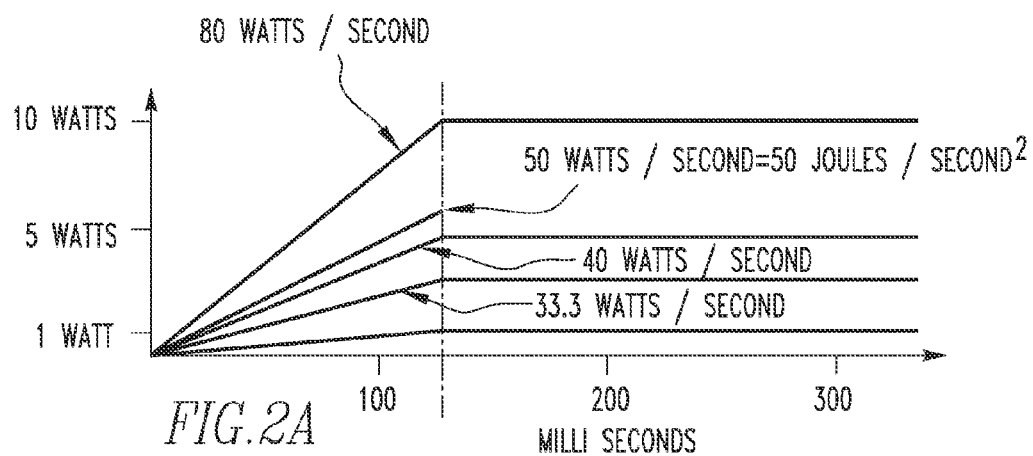
FIGS. 2A and 2B are schematic diagrams demonstrating the results of experiments performed by the present inventors using an exemplary pacemaker device to show how energy acceleration effects pacemaker interference.
Figure 2B:
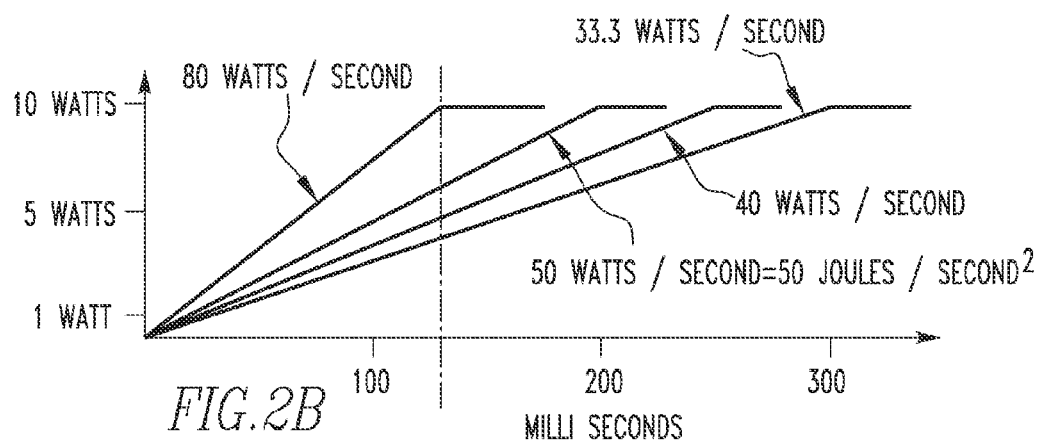

The present inventors were able to verify their discovery by conducting an experiment using an exemplary pacemaker device. The results of the experiment are shown graphically in FIGS. 2A and 2B. In one aspect of the experiment (FIG. 2A), the RF power level applied to the pacemaker was linearly increased (ramped) five different times over a 0.125 second period (the ramp time) from zero power to five different maximum power levels, with 40 dBm (10 Watts) being the highest. In this aspect of the experiment, only the increase to 40 dBm (10 Watts), which was an 80 Watts/second energy acceleration, caused interference with the pacemaker. In a second aspect of the experiment (FIG. 2B), the RF power level applied to the pacemaker was linearly increased (ramped) four different times, each time to 40 dBm (10 Watts). However, this time, the ramp time was different each time, and thus the energy acceleration was different each time. As seen in FIG. 2B, the ramp times varied from 0.125 seconds to 0.300 seconds and the energy accelerations were 80 Watts/second, 50 Watts/second, 40 Watts/second, and 33.3 Watts/second. In this aspect of the experiment, only the 80 Watts/second signal resulted in interference. The other signals did not result in interference, even though they, like the 80 Watts/second signal, had a maximum power level of 40 dBm (10 Watts). Thus, it was the energy acceleration (somewhere in excess of 50 Watts/second) that caused the interference, not the ultimate RF power level that was reached.

Thus, in one embodiment, the present invention relates to a method of transmitting RF energy that mitigates interference with critical care medical equipment by transmitting RF energy in a manner that controls the energy acceleration of the transmitted signal so that it does not reach a level that causes interference. More specifically, in one embodiment, the present invention provides a method of transmitting RF energy that mitigates interference with critical care medical equipment by transmitting RF energy according to an RF power profile having the following four consecutive transmission portions: (i) a upward ramping portion where the RF power monotonically increases for a time period, from some minimum power level, e.g., zero, to some maximum power level, (ii) a stay portion where the RF power is constant at the maximum power level for a time period, (iii) a downward ramping portion where the RF power monotonically decreases for a time period, from the maximum power level (the stay portion level) to some minimum power level, e.g., zero, and (iv) an off portion where no RF energy is transmitted for a time period.

Figure 3:
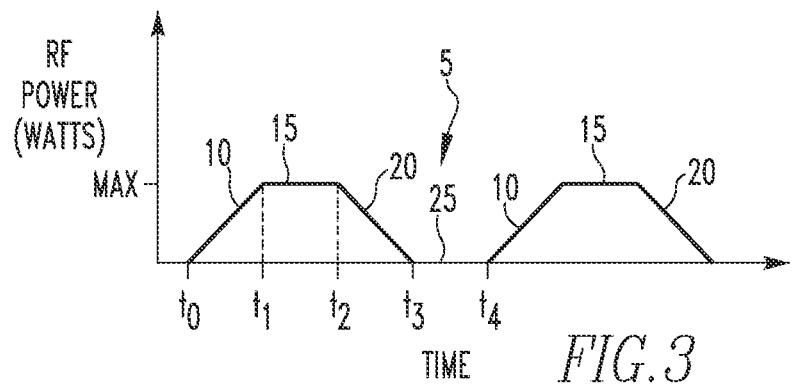
FIG. 3 is a schematic diagram showing an RF power profile including linear curves according to one example embodiment of the present invention.
Figure 4:
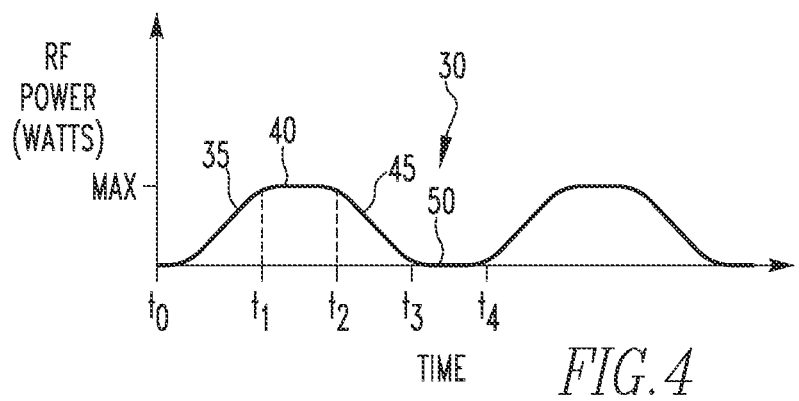
FIG. 4 is a schematic diagram showing an RF power profile including non-linear curves according to another example embodiment of the present invention.

The upward ramping and downward ramping portions of the RF power profile can be linear or non-linear monotonic curves. FIG. 3 is a schematic diagram showing one example embodiment of an RF power profile 5 including linear curves. More specifically, RF power profile 5 shown in FIG. 3 includes linear upward ramping portion 10 extending from $t_0$ to $t_1$, flat stay portion 15 extending from $t_1$ to $t_2$, linear downward ramping portion 20 extending from $t_2$ to $t_3$, and off portion 25 extending from $t_3$ to $t_4$. In addition, as seen in FIG. 3, RF power profile 5 may repeat one or more times thereafter. FIG. 4 is a schematic diagram showing another example embodiment of an RF power profile 30 including non-linear curves. More specifically, RF power profile 30 includes non-linear (s-shaped) upward ramping portion 35 extending from $t_0$ to $t_1$, flat stay portion 40 extending from $t_1$ to $t_2$, non-linear (s-shaped) downward ramping portion 45 extending from $t_2$ to $t_3$, and off portion 50 extending from $t_3$ to $t_4$. In addition, as seen in FIG. 4, RF power profile 30 may repeat one or more times thereafter.

In one exemplary embodiment, the curves of the upward ramping and downward ramping portions (e.g., without limitation, 10, 35, 20, 45) are chosen so that at no part or segment of the curve will the slope thereof exceed the slope that corresponds to some predetermined energy acceleration value that, if exceeded, will cause interference with critical care medical equipment, such as, without limitation, cardiac rhythm management devices (CRMDs), like pacemakers. That predetermined energy acceleration value may be, for example, 80 Watts/second, 75 Watts/second, 70 Watts/second, 65 Watts/second, 60 Watts/second or 55 Watts/second, some value between 80 Watts/second and 50 Watts/second, or some other value. As a result, during the upward ramping and downward ramping portions (e.g., without limitation, 10, 35, 20, 45), interference is avoided because the energy acceleration is maintained below the interference causing level.

In another exemplary embodiment, in the upward ramping portion, the RF power may be represented by any monotonically increasing function $f_1(t)$, where t is between the beginning of the upward ramping portion and the beginning of the stay portion. The dimensions of $f_1(t)$ are Watts. To avoid interference, the absolute value of the derivative of $f_1(t)$, $|d(f_1(t)/dt|$, for all t during the upward ramping portion must be less than some predetermined value (Watts/second) that, if exceeded, will cause interference. In the exemplary embodiment, to avoid interference, the absolute value of the derivative of $f_1(t)$, $|d(f_1(t)/dt|$, for all t during the upward ramping portion must be <80 Watts/second, and in alternative embodiments, $|d(f_1(t)/dt|$ must be <75 Watts/second, or <70 Watts/second, or <65 Watts/second, or <60 Watts/second, or <55 Watts/second. In addition, in this exemplary embodiment, in the downward ramping portion, the RF power may be represented by any monotonically decreasing function $f_2(t)$, where t is between the beginning of the downward ramping portion and the beginning of the off portion. The dimensions of $f_2(t)$ are Watts. To avoid interference, the absolute value of the derivative of $f_2(t)$, $|d(f_2(t)/dt|$, for all t during the downward ramping portion must be less than some predetermined value (Watts/second) that, if exceeded, will cause interference. In the exemplary embodiment, to avoid interference, the absolute value of the derivative of $f_2(t)$, $|d(f_2(t)/dt|$, for all t during the downward ramping portion must be <80 Watts/second, and in alternative embodiments, $|d(f_2(t)/dt|$ must be <75 Watts/second, or <70 Watts/second, or <65 Watts/second, or <60 Watts/second, or <55 Watts/second.

In still another embodiment, in the upward ramping portion, the rise time (i.e., the time it takes to go from some minimum (e.g., zero or 10% of the maximum) power level to some percentage (e.g., 90% or 100%) of the maximum power level) is 100 milliseconds or less, and in the downward ramping portion, the fall time (i.e., the time it takes to go from some percentage (e.g., 90% or 100%) of the maximum power level to some minimum (e.g., zero 10% of the maximum) power level is also 100 milliseconds or less.

As noted elsewhere herein, certain high rates of change of power, if short enough in duration, will not be detected by a critical care medical devices such as a pacemaker, even of the high rate of change exceed the energy acceleration value that causes interference. For example, rates of change of 10 milliseconds or less are not normally able to be detected by pacemakers, and thus amplitude modulation is possible without causing interference. Thus, according to a further embodiment of the invention, a method of mitigating RF interference with one or more critical care medical devices is provided, wherein a predetermined threshold energy acceleration value is associated with the one or more critical care medical devices that, if exceeded, will cause RF interference with the one or more critical care medical devices. The method generating and transmitting RF energy, wherein at least a portion of said RF energy follows an RF power profile of power versus time, the RF power profile having an upward ramping portion, a stay portion immediately following the upward ramping portion wherein power of the RF energy is at a maximum, and a downward ramping portion immediately following the stay portion, wherein, except for parts of the upward ramping portion that are too short in duration for rates of change of power exceeding the predetermined threshold energy acceleration to be detected by the one or more critical care medical devices and cause interference, the upward ramping portion monotonically increases and a slope of the upward ramping portion at any other parts thereof does not exceed the predetermined threshold energy acceleration value and wherein, except for parts of the downward ramping portion that are too short in duration for absolute values of rates of change of power exceeding the predetermined threshold energy acceleration to be detected by the one or more critical care medical devices and cause interference, the downward ramping portion monotonically decreases and an absolute value of a slope of the downward ramping portion at any other parts thereof does not exceed the predetermined threshold energy acceleration value.

During the stay portion described above, the RF energy may be amplitude, frequency or phase modulated in order to transmit desired information to devices such as RFID tags or cellular telephones or PDAs. The present inventors have determined that the ON/OFF periods required for symbol generation during such amplitude modulation are sufficiently small/short (10 milliseconds or less) such that they do not cause interference with critical care medical equipment. Rather, it is the OFF/ON and ON/OFF transitions at the beginning and end of the CW portion of the frame repetition periods described elsewhere herein that cause the interference.

During the stay portion described above, the RF energy may, in an alternative embodiment, be frequency modulated in order to transmit desired information to devices such as RFID tags or cellular telephones or PDAs. Frequency modulation maintains essentially the same energy from one frequency to another without causing interference with the CRMDs.

In another aspect, the present invention provides an RF emitter device that rather than being designed to transmit continuous wave (CW) RF energy signals using an ON/OFF pattern as shown in FIG. 1 by being programmed and structured to transition from generating and transmitting no RF energy (i.e., a rest state) to generating and transmitting some predetermined maximum CW RF energy (i.e., an OFF to ON transition), is programmed and structured to generate and transmit RF energy according to one or more of the RF power profiles described herein that mitigates interference with critical care medical equipment. One such RF emitter, in the form of RFID reader device 60, is shown in FIG. 5 and is described below.

Figure 5:
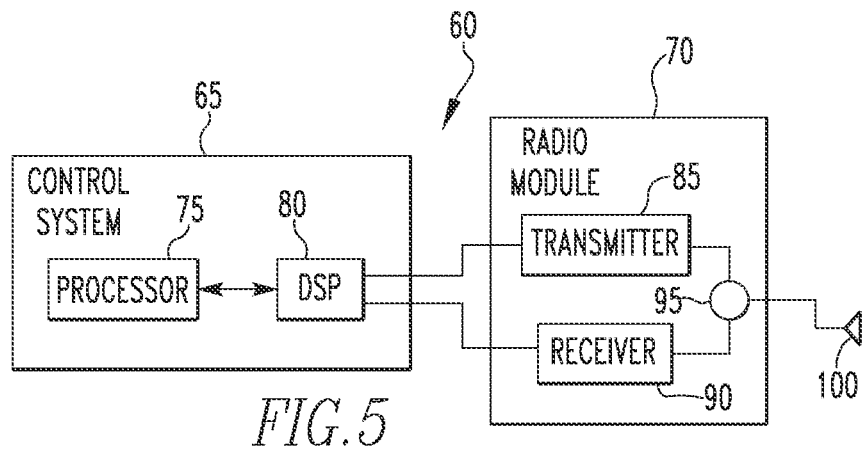
FIG. 5 is a block diagram an RFID reader device according to one exemplary embodiment of the invention.

Referring to FIG. 5, RFID reader device 60 includes control system 65 and radio module 70. In the illustrated embodiment, control system 65 includes processor 75, such as a microcontroller or microprocessor (including associated memory), and a digital signal processor (DSP) 80, although other configurations are possible. Processor 75 provides control over high level operation of reader device 60 and may communicate with an external network and/or peripheral devices. DSP 80 provides direct control over all operations of radio module 70 in response to high level commands provided by processor 75, and processes data signals received from transponder devices, such as RFID tags. Radio module 70 is adapted to provide for communications to/from such transponder devices by generating and receiving RF signals. More particularly, radio module 70 further comprises transmitter portion 85, receiver portion 90, and hybrid 95. Hybrid 95 may further comprise a circulator and connects transmitter portion 85 and receiver portion 90 to antenna 100 while isolating them from each other. Furthermore, transmitter portion 85 includes a local oscillator that generates an RF carrier frequency. Processor 75 and/or DSP 80 is programmed to be able to selectively cause transmitter portion 85, using the RF carrier frequency just described, to send an RF transmission signal having one or more of the RF power profiles described herein to hybrid 100, which in turn passes the signal to antenna 100 to be sent over the air to transponder devices, such as RFID tags. In particular, control system 65 is programmed to cause radio module 70 to generate a plurality of particular power levels between zero power and the maximum power level during both the upward ramping portion and the downward ramping portion of the RF power profile. Antenna 100 also provides for the capture of any signals radiated by the transponder devices, which are passed back to through receiver portion 90 and to DSP 80 for processing thereby. Thus, RFID reader 60 is structured and programmed to mitigate interference with critical care medical equipment by transmitting RF energy in a manner that controls the energy acceleration of the transmitted signal so that it does not reach a level that causes interference. More specifically, in the exemplary embodiment, RFID reader 60 is structured and programmed to engage in RF communications in a manner that mitigates interference with critical care medical equipment by transmitting RF energy according to one or more of the RF power profiles described herein. Similar principles may be applied to other RF emitter devices, such as, without limitation, RF emitters used in wireless telecommunications networks.

I. The Basis for Mitigation Connecting the Medium and the CRMD

The primary factors involved with an RFID interrogator, the medium between the antenna and the CRMD that produce interference are the power transmitted, the attenuating medium, the sensitivity and other parameters of the CRMD. Each of these factors can be characterized in mathematical terms that are possible to identify and quantify. The initial observation of a key phenomenon was the result of establishing profiles for repeatable testing that was conducted through over 7,000 laboratory experiments with a variety of CRMDs, RFID interrogators, torso models and state of the art test equipment.

Signal profiles confirmed observations in the literature that continuous wave (CW) RF does not interfere with CRMDs. Instead, as described elsewhere herein, it is only the turning on and off of the CW that causes the interference. The initial conjecture must be that that the sharp transition of the leading edge change of state was the problem due to the frequencies it induces in the spectrum of the pass band of the CRMD sensing elements. This may be true to some extent. However, the following development will show that the relationship to interference is actually an induced voltage that can be interpreted as the leading edge of the QRS Complex which is well known to people in the medical field such as cardiology.

To test this hypothesis, an RFID interrogator was developed with a variable ramp transition of power from no CW to full power CW and vice versa. The ramp could be varied to interfere or not interfere with a given CRMD. This result is the starting point for the following mathematical development of the relevant factors of the interference of RFID interrogators with CRMDs.

One of the difficulties in consistently measuring and calibrating a torso analysis based on interferences is the digital signal processing used in the commercial pacemaker/ICD to recognize features such as the P Wave, QRS Complex, T Wave, etc., which are well known to people in the medical field such as cardiology The various techniques look at pattern comparisons and other features of the QRS to discriminate the energy patterns including the QRS Interval. One such sensing mechanism is the slope of the QR portion of the QRS Complex.

Assuming a symmetric QRS Complex with a normal QRS duration of 0.06 to 0.1 seconds and a voltage maximum of 0.0009 volts at the QRS maximum, the resulting slew rate is in the range of 0.018 to 0.030 volts per second.

Consider now an RF emitter with power, $P(t)=Kf(t)$, which is a time changing function of power, in the proximity of a CRMD sensor having an effective resistive load component, r, and with an induced voltage, v, across the effective load of the CRMD sensing input, r. Power, $\alpha P(t)$ ($\alpha>0$), is seen by the CRMD sensor across, r. Thus:

$$\alpha P(t)=v(t)^2/r \rightarrow v(t)=\{\alpha P(t)r\}^{1/2}=\{\alpha Kf(t)r\}^{1/2} \quad (1)$$

The rate of change of the induced voltage across r which could be interpreted as an intrinsic heart signal slew rate for the QRS from Q to R is:

$$dv/dt=d/dt\{\alpha Kf(t)r\}^{1/2}=\{\alpha K/r\}^{1/2}d\{f(t)/dt\}^{1/2}=\lambda(t)<v_{QRS}/0.5QRS(\max) \quad (2)$$

The profile of the RFID interrogator power can be adjusted so as to conform to the restriction imposed by (2) above. The description of $\alpha$ can be determined by physics and physiology through a combination of experimentation and mathematical development. This is the area where the human torso models can be a help and the development of a single torso model will be a major help.

The value of r can be determined by direct experimentation with a given CRMD. While the torso models such as those of the FDA and Hokkaido can be helpful in determining $\alpha$, the Tissue Interface Circuit (TIC) of AAMI (ANSI/AAMI PC69: 2006, Active implantable medical devices—5 Electromagnetic compatibility—EMC test protocols for implantable cardiac pacemakers and implantable cardioverter defibrillators) or a slight modification can be used in a highly controlled laboratory environment to determine r. This can be done independent of the determination of a thus providing a more accurate experimental procedure where the results do not need to be separated into the $\alpha$ and r components.

Once $\alpha$ and r are determined, they can then be verified initially through the torso model and then through the animal and human trials.

II. Mitigation and Modulation

The ON/OFF CW mitigation technique described elsewhere herein at the beginning or the end of a transmission does not appear to be practical for amplitude modulation with high speed data transmission. As noted elsewhere herein, empirical testing in the laboratory has shown that the ON/OFF/ON CW periods of 10 m seconds and less does not interfere with a CRMD. Based on the previous power transition analysis, consider a transition of more than x Watts per second, $$50 \text{ Watts per Second} \leq x \leq 80 \text{ Watts per Second} \quad (3)$$

Consider a 10 Watt power level with 100% modulation. As a close approximation, the CW ON/OFF/ON with 100% modulation in 10 m Seconds means:

$$\text{Watts}/5 \text{ m Seconds}=2{,}000 \text{ Watts per second} \quad (4)$$

Thus, the voltage on an ON/OFF/ON transition must not have changed as drastically as expected due to the no interference results. Assume the x Watt per Second condition is the previous interference boundary which changes at a rate of x Watts per Second. The voltage is assumed given by $\lambda(t)$ as in (2). At x Watts per Second, assume $\tau$ is the time to reach 10 Watts. At $\tau$, there is some voltage $v(\tau)>0$ at the CRMD sensing input. Thus the voltage change in an ON/OFF/ON transition is $v(\tau)-0=v(\tau)$ volts in $\tau$ seconds. Assume $\tau=0.25$ seconds. Thus, within the 10 m Seconds window, when the power is removed, and then turned on at 100% (10 Watts) in 10 m Seconds, there are three voltages of interest; $v(\tau)$, $v(\tau+0.005)$, and $v(\tau+0.010)$, where, $v(\tau)>v(\tau+0.005)<v(\tau+0.010)$. It is clear from the no interference result that, $v(\tau+0.005)\neq 0$, otherwise the CRMD would sense the rate of change of voltage as a QRS Complex and there would be interference.

Obviously in (2), the $df(t)/dt \neq \infty$, as would be the case if the power changes instantaneously across a resistor, suggests capacitance, C, exists in the CRMD sensing equivalent circuit. While the capacitance may not be significant in the sensing of the RF emitter, it does play a role in the short term OFF portion of the ON/OFF/ON cycles of the RF carrier. For the relative short modulation present in the ON/OFF/ON periods, the capacitance is apparently sufficient to hold $v(\tau)$ at a level so as to not be sensed as a QRS slew rate. Thus, $v(t)$ will not go to zero (0) volts in 5 m Seconds and;

$$\min\{QRS \text{ Complex slope}\} \geq dv(t)/dt : 0 \leq t \leq 10 \text{ m Seconds} \quad (5)$$

When the CW power, $P(t)=0$, for the OFF portion of the ON/OFF/ON transition, the voltage across the capacitor will behave as:

$$v(t)=v(\tau)e^{-t/RC} \quad (6)$$

The rate of change of $v(t)$, $dv(t)/dt$, is given by;

$$dv(t)/dt=-(1/RC)v(t)e^{-t/RC} \quad (7)$$

The magnitude of the rate must be less than the anticipated slope of the QRS Complex, $v(\tau)/0.05$.

$$|-(1/RC)v(\tau)e^{-t/RC}|<|v(\tau)/0.05| \text{ with } v(\tau)\geq 0 \quad (8)$$

$$\max\{|-(1/RC)v(\tau)e^{-t/RC}|\}=\max\{|v(\tau)|\cdot(1/RC)e^{-t/RC}\}<20|v(\tau)| \quad (9)$$

The maximum occurs @ $t=0$, giving the requirement that $$1/RC<20 \therefore RC>0.05 \text{ in this particular embodiment} \quad (10)$$

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of mitigating RF interference with one or more critical care medical devices, wherein a predetermined threshold energy acceleration value is associated with the one or more critical care medical devices that, if exceeded, will cause RF interference with the one or more critical care medical devices, the method comprising:

generating and transmitting RF energy, wherein at least a portion of said RF energy follows an RF power profile of power versus time, the RF power profile having an upward ramping portion wherein power of the RF energy monotonically increases, a stay portion immediately following the upward ramping portion wherein power of the RF energy is at a maximum, and a downward ramping portion immediately following the stay portion wherein power of the RF energy monotonically decreases, wherein at no point in the upward ramping portion does a slope thereof exceed the predetermined threshold energy acceleration value and wherein at no point in the downward ramping portion does an absolute value of a slope thereof exceed the predetermined threshold energy acceleration value.

2. The method according to claim 1, further comprising determining the predetermined threshold energy acceleration value.

3. The method according to claim 1, wherein the generating and transmitting RF energy comprises generating and transmitting the RF energy from an RFID reader device.

4. The method according to claim 1, wherein the generating and transmitting RF energy comprises generating and transmitting the RF energy from an RF emitter used in a wireless telecommunication network.

5. The method according to claim 1, wherein in the upward ramping portion, the power increases from zero to a maximum power and wherein in the downward ramping portion the power decreases from the maximum power to zero.

6. The method according to claim 1, wherein the RF power profile includes an off portion immediately following the downward ramping portion wherein no RF energy is transmitted.

7. The method according to claim 1, wherein the RF energy is amplitude modulated during the stay period.

8. The method according to claim 1, wherein the RF energy is phase modulated during the stay period.

9. The method according to claim 1, wherein the RF energy is frequency modulated during the stay period.

10. The method according to claim 1, wherein the predetermined threshold energy acceleration value is 80 Watts/second.

* * * * *

UNITED STATES PATENT AND TRADEMARK OFFICE
CERTIFICATE OF CORRECTION

PATENT NO. : 8,489,057 B2
APPLICATION NO. : 13/234467
DATED : July 16, 2013
INVENTOR(S) : Marlin H. Mickle et al.

It is certified that error appears in the above-identified patent and that said Letters Patent is hereby corrected as shown below:

Title Page, Item (57), ABSTRACT, line 5, "inference" should read --interference--.
Title Page, Item (57), ABSTRACT, line 6, "includes" should read --include--.

In the Specification
Column 1, line 67, "such a" should read --such as a--.
Column 4, line 24, "effects" should read --affects--.
Column 4, line 31, "diagram an" should read --diagram of an--.
Column 4, line 42, "employed, herein," should read --employed herein,--.
Column 5, line 39, "a upward" should read --an upward--.
Column 6, line 57, "devices" should read --device--.
Column 6, line 57, "even of" should read --even if--.
Column 6, line 58, "exceed" should read --exceeds--.
Column 8, line 23, "back to" should read --back--.
Column 9, lines 41-43,
"Active implantable medical devices − 5 Electromagnetic compatibility − EMC test protocols for implantable cardiac pacemakers and implantable cardioverter defibrillators)"
should read
--*Active implantable medical devices − 5 Electromagnetic compatibility − EMC test protocols for implantable cardiac pacemakers and implantable cardioverter defibrillators)*--.
Column 9, line 46, "a" should read --α--.
Column 9, line 62, "50 Watts per Second $\leqq$ × $\leqq$ 80 Watts per Second        (3)"
should read
--50 Watts per Second $<$ × $<$ 80 Watts per Second        (3)--.
Column 10, line 27, "min{QRS Complex slope} $\geqq$ dv(t)/dt : 0 $\leqq$ t $\leqq$ 10 m Seconds        (5)"
should read
--min{QRS Complex slope} $\geq$ dv(t)/dt : 0 $\leq$ t $\leq$ 10 m Seconds        (5)--.

Signed and Sealed this
Fourth Day of February, 2014

Michelle K. Lee
*Deputy Director of the United States Patent and Trademark Office*

CERTIFICATE OF CORRECTION (continued)
U.S. Pat. No. 8,489,057 B2

Column 10, line 40,

"$| - (1/RC)\, v(\tau)\, e^{-t/RC} | < | v(\tau)/0.05 |$ with $v(\tau) \geqq 0$ (8)"

should read

--$| - (1/RC)\, v(\tau)\, e^{-t/RC} | < | v(\tau)/0.05 |$ with $v(\tau) \geq 0$ (8)--.